United States Patent
Reddy

(10) Patent No.: US 10,264,121 B2
(45) Date of Patent: Apr. 16, 2019

(54) MESSAGE TRANSCRIPTION FOR EMERGENCY CALL PRIORITIZATION

(71) Applicant: T-Mobile USA, Inc., Bellevue, WA (US)

(72) Inventor: Ravikiran Reddy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/691,533

(22) Filed: Aug. 30, 2017

(65) Prior Publication Data
US 2019/0068784 A1    Feb. 28, 2019

(51) Int. Cl.
| H04M 3/51 | (2006.01) |
| H04M 3/523 | (2006.01) |
| H04M 3/533 | (2006.01) |
| G10L 15/26 | (2006.01) |
| G06F 17/27 | (2006.01) |

(52) U.S. Cl.
CPC ....... *H04M 3/5116* (2013.01); *G06F 17/2765* (2013.01); *G06F 17/2785* (2013.01); *G10L 15/265* (2013.01); *H04M 3/5235* (2013.01); *H04M 3/53333* (2013.01); *H04M 2201/42* (2013.01); *H04M 2242/04* (2013.01)

(58) Field of Classification Search
USPC .................................. 455/404.1; 379/37–52
See application file for complete search history.

(56) References Cited

U.S. PATENT DOCUMENTS

| 9,622,060 | B2* | 4/2017 | Wingert | H04W 4/90 |
| 2014/0094134 | A1* | 4/2014 | Balthasar | H04W 4/90 |
| | | | | 455/404.1 |
| 2014/0214423 | A1* | 7/2014 | Camargo | H04M 3/2281 |
| | | | | 704/246 |
| 2014/0273979 | A1* | 9/2014 | Van Os | H04M 3/533 |
| | | | | 455/412.2 |
| 2014/0364081 | A1 | 12/2014 | Rauner | |
| 2015/0103982 | A1 | 4/2015 | O'Conor et al. | |

FOREIGN PATENT DOCUMENTS

| JP | 06046161 | 2/1994 |
| JP | 2002099979 A | 4/2002 |
| JP | 2003158586 A | 5/2003 |

OTHER PUBLICATIONS

PCT Search Report and Written Opinion dated Dec. 11, 2018 for PCT Application No. PCT/US2018/045607, 13 pages.

* cited by examiner

*Primary Examiner* — Maria El-Zoobi
(74) *Attorney, Agent, or Firm* — Lee & Hayes, PLLC

(57) ABSTRACT

A method of prioritizing emergency calls received at a public safety answering point (PSAP) management system, New emergency calls can be placed on hold and added to a call queue. An audio emergency description message can be recorded from the caller while the emergency call is on hold, and a transcript of the audio emergency description message can be generated using automatic speech recognition. The transcript can be displayed to users in a dashboard while the emergency call is on hold, and a priority level of the emergency call can be adjusted within the call queue based on the transcript, such that urgent emergency calls can be prioritized and answered before less urgent emergency calls.

20 Claims, 5 Drawing Sheets

Call Queue 108

| Order | Call Identifier | Transcript |
|---|---|---|
| 1 | 555-555-1234 | "We were in a car accident and my wife is losing blood quickly! |
| 2 | 555-555-6789 | "Help! My house is on fire!" |
| 3 | 555-555-2356 | "I just saw a mugging on the street, but everyone seems OK" |
| 4 | 555-555-5678 | "I think my cat is stuck in a tree" |

FIG. 2

Call Queue 108

| Priority Attribute | Call Identifier | Transcript |
|---|---|---|
| Default | 555-555-2356 | "I just saw a mugging on the street, but everyone seems OK" |
| HIGH | 555-555-6789 | "Help! My house is on fire!" |
| Default | 555-555-5678 | "I think my cat is stuck in a tree" |
| HIGH | 555-555-1234 | "We were in a car accident and my wife is losing blood quickly! |

FIG. 3

MESSAGE TRANSCRIPTION FOR EMERGENCY CALL PRIORITIZATION

BACKGROUND

Public safety answering points (PSAP) are call centers set up in communities to receive emergency calls placed to phone numbers such as 911. PSAP operators answer the emergency calls and speak to the caller to determine the nature of their emergency. The PSAP operators can then dispatch emergency services to respond to the emergencies.

Timely response to emergencies can be critical to saving lives. However, when a PSAP does not have enough operators to handle all of the emergency calls it receives, there is a risk of urgent emergencies not being addressed in time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 depicts an example of a call queue arranged in priority order.

FIG. 3 depicts an example of a call queue with priority attributes associated with each emergency call.

DETAILED DESCRIPTION

Introduction

Calling an emergency number, such as 911, can be one of the most effective ways of getting assistance from police, fire, medical, and other personnel when emergencies happen. Such emergency calls can be routed to a public safety answering point (PSAP), where operators can talk to callers to determine the nature of their emergency and then dispatch emergency services in response.

However, due to budget or manpower constraints, at any point in time there may not be enough operators on duty to handle all of the emergency calls received at a PSAP. If an emergency call is not answered immediately, it may continue to ring or be placed on hold until an operator is available to answer the call. Because such waiting calls are often answered in the order in which they were received, calls about extremely urgent emergencies may need to wait on hold for extended periods of time. This can unfortunately lead to dangerous or even fatal situations in which callers are not able to get the help they need in a timely manner.

Automated interactive voice response (IVR) systems have been developed that can answer phone calls and recognize commands or other information within voice input received from the caller. The recognized voice input can be used to route callers through phone menus or perform other automated tasks. However, IVR systems generally do not present the information they recognize within received voice input to any users until an operator actually answers the call. Accordingly, PSAP personnel may not be able to review such information while calls are on hold, and may not be able to adjust the order in which calls are answered based on that information. This can again lead to dangerous situations in which urgent calls must wait on hold for extended periods of time until an operator is available.

This disclosure describes various systems and processes that can be implemented at a PSAP to assign priorities to incoming emergency calls that have not yet been answered, such that waiting emergency calls can be answered Out of order based on assigned priorities to respond more quickly to waiting calls that have been identified as more urgent than other waiting calls. As described he . a PSAP can place incoming calls on hold and record emergency description messages from the callers while their calls are waiting to be answered. The recorded emergency description messages can be automatically transcribed into text, and the corresponding transcripts can be displayed to users and be reviewed to determine the nature of the emergency associated with the calls on hold. The calls can thus be prioritized within a call queue based on the nature of the emergency, such that waiting calls can be answered out of order lased on their priorities and the most critical calls can be answered first regardless of when they were received.

Example Environment

Figure 1:
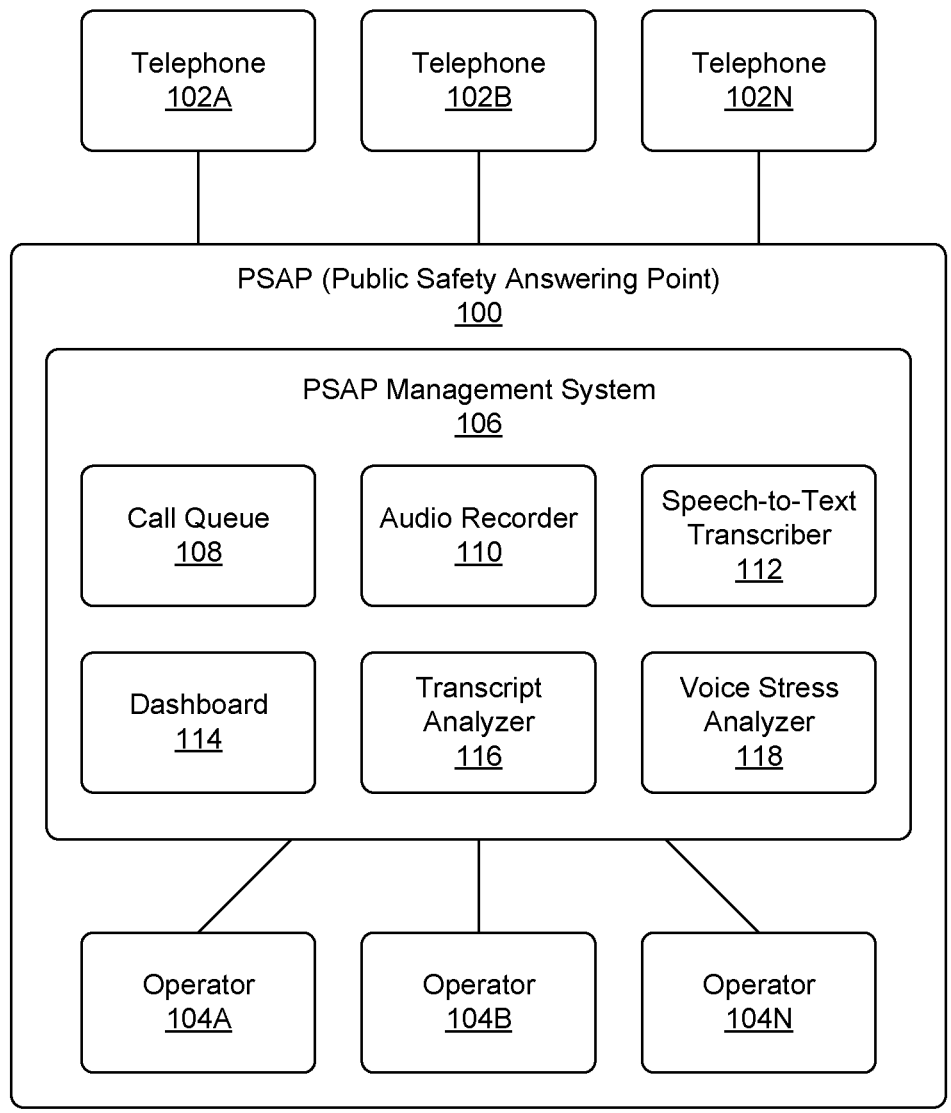
FIG. 1 depicts an example of a public safety answering point (PSAP).

FIG. 1 depicts an example of a public safety answering point (PSAP) 100. A PSAP 100 can be a call center where emergency calls are received from telephones 102 and are answered by operators 104. By way of a non-limiting example, a call placed to an emergency number such as 911 can be routed by a telephone network to a PSAP 100.

In some examples the PSAP 100 to which an emergency call is routed can be selected based on the location of the calling telephone 102, as determined from a physical address associated with a landline telephone's telephone number or through an Enhanced 911 (E911) system for mobile telephones and Voice over IP (VoIP) telephones. For example, an E911 system can determine a mobile telephone's location using the telephone's phone number, the location of the cell tower to which it is connected, GPS coordinates reported from the telephone, cell tower triangulation, and/or other information.

A PSAP 100 can have PSAP Management System 106 comprising a call queue 108, an audio recorder 110, a speech-to-text transcriber 112, and a dashboard 114. In some examples the PSAP Management System 106 can further comprise a transcript analyzer 116 and/or voice stress analyzer 118. The PSAP Management System 106 can be implemented in any one or more computing devices, such as PCs, laptop computers, workstations, server systems, mainframes, server farms, or any other computing device. An example device of such a computing device is illustrated in greater detail in FIG. 6, and is described in detail below with reference to that figure.

The call queue 108 can be a queue representing emergency calls received at the PSAP 100 that have not yet been answered by an operator 104. If an emergency call is received at the PSAP 100 and an operator 104 is available, the emergency call can be routed to an operator 104 who can answer the call. However, if no operators 104 are available at the time an emergency call is received at the PSAP 100, the PSAP Management System 106 can place the call on hold and add the emergency call to the call queue 108. Information about different emergency calls in the call queue

108 can be stored in memory in the PSAP Management System 106 in a stack, database, or any other type of data structure.

When an emergency call from a caller is placed on hold by the PSAP Management System 106 and is added to the call queue 108, an audio recorder 110 at the PSAP Management System 106 can record an audio emergency description message from the caller. By way of a non-limiting example, the PSAP Management System 106 can play an audio message for the caller indicating that all operators are currently busy, but that the caller can begin speaking to explain the reason for their call, such as by asking the caller to state their name, location, nature of their emergency, and/or any other information. The PSAP Management System 106 can at least temporarily store the audio recorded from the caller in response to this prompt in memory such that it is accessible by the speech-to-text transcriber 112 as described below.

In some examples, the PSAP Management System 106 can automatically and/or continuously record a caller's emergency description message while the caller's emergency call is on hold, until the emergency call is answered by an operator 104. In other examples, the PSAP Management System 106 can provide a caller with an option to record an emergency description message while on hold. In some of these examples, the PSAP Management System 106 can also periodically provide options to record additions to previous emergency description messages that provide additional information as an emergency unfolds while the emergency call is on hold.

As the PSAP Management System 106 records a caller's emergency description message, the speech-to-text transcriber 112 can use automatic speech recognition to generate a transcript from the audio emergency description message. The transcript can contain text of words recognized within the audio emergency description message. In an example, automatic speech recognition can use statistical models, such as an acoustic model and a language model, to identify phonemes within input audio and determine which words of a language are most likely to be associated with combinations of phonemes.

As the speech-to-text transcriber 112 recognizes words within the audio emergency description message, it can append those words to the transcript associated with the emergency call. In an example, as a caller continues to speak while his or her emergency call is on hold in the call queue 108, the PSAP Management System 106 can continue to record the emergency description message and the speech-to-text transcriber 112 can continue to recognize words within the received audio and append the newly recognized words to the end of the transcript. Accordingly, in some examples the speech-to-text transcriber 112 can generate a transcript in near real-time.

In some examples, a recorded audio emergency description message can be kept in memory at the PSAP Management System 106 or any other data location. In other examples, some or all portions of a recorded audio emergency description message that have been transcribed by the speech-to-text transcriber 112 can be discarded.

FIGS. 2 and 3 depict non-limiting examples of a call queue 108. The call queue 108 can include one or more identifiers associated with each emergency call on hold in the call queue 108, such as the phone number of the calling telephone 102 or a unique identifier assigned to the emergency call by the PSAP Management System 106. In some examples the call queue 108 can also track other information about the emergency calls in the call queue 108, such as the times the emergency calls were received, the amount of time each emergency call has been on hold, a location associated with the calling telephone 102, or any other type of information.

The call queue 108 can associate a priority level with each emergency call. The PSAP Management System 106 can assign a default priority level to each new emergency call added to the call queue 108. Each emergency call's priority level can then be updated from that default priority level based on the transcript generated from an emergency description message associated with the emergency call, as will be discussed further below.

FIG. 2 depicts an example of a call queue 108 in which the priority level of an emergency call is indicated by the order of the emergency call within the call queue 108. For example, emergency calls at the top of the call queue 108 can be considered to have higher priorities than emergency calls lower in the call queue 108. The emergency call at the top of the call queue 108 thus can be the next one that will be answered by an operator 104, at which time it can be removed from the call queue 108. Each new emergency call that is received can be placed at the bottom of the call queue 108, indicating that the emergency call has the lowest priority by default until another new emergency call is received and added below it. As described herein, in these examples the order of the emergency calls in the call queue 108 can be adjusted based on their associated transcripts to change their priority levels and thus change the order in which the emergency calls will be answered.

FIG. 3 depicts an example of a call queue 108 in which the priority level of an emergency call is indicated by a priority attribute stored in association with the emergency call. The priority attribute can have a value indicating a priority level assigned to the associated emergency call, such as a number, letter, symbol, color, or any other value. In some examples the priority attribute can have a binary value indicating whether the associated emergency call is or is not a high priority, while in other examples the value of the priority attribute can indicate one of a plurality of different possible priority levels, such as low, medium, and high priority or a priority level on a numeric scale. In some examples, the priority attribute of each new emergency call added to the call queue 108 can be set to a default priority level, and the value of the priority attribute for individual emergency calls can be adjusted based on their associated transcripts as described herein.

The PSAP Management System 106 can display some or all information from the call queue 108 in the dashboard 114. The dashboard 114 can be a user interface through which users can view information about emergency calls in the call queue 108, including their priority levels and transcripts. In some examples, the dashboard 114 can accessible to operators 104, managers, or other users through a software application or a webpage.

In some examples priority attributes, call order, and/or other information about emergency calls in the call queue 108 can be stored in memory in a database, such that the database can be queried to display the call queue 108 within the dashboard 114 in priority order as shown in FIG. 2, with the values of priority attribute fields displayed as shown in FIG. 3, or in any other order.

The transcripts associated with each emergency call in the call queue 108 can be fully or partially visible in the dashboard 114. In some examples, when a transcript is too long to be fully visible within the dashboard 114, the text of the transcript can scroll through an area in the dashboard. As such, users can read the transcripts to understand the nature of the emergencies associated with the emergency calls that are on hold and have not yet been answered. They can accordingly use that information to prepare for a call and understand the emergency situation before answering a particular call, and/or to adjust the priority levels of emergency calls within the call queue 108 so that the emergency calls can be answered in an order based on their priority level rather than the order in which they were received at the PSAP 100.

In some examples, the dashboard 114 can have input controls that allow a user, such as manager or operator 104, to adjust the priority level of an emergency call within the call queue 108 after reviewing the transcript associated with the emergency call. For instance, the user can use the dashboard 114 to review an emergency call's transcript and understand the nature of the emergency, determine its priority level either on its own or relative to the priority levels of other emergency calls in the call queue 108, and then modify the call queue 108 by moving the emergency call to a different position within the call queue 108 or by assigning a particular value to the emergency call's priority attribute.

In some examples the transcript analyzer 116 can automatically search for keywords within the transcripts. The transcript analyzer 116 can be loaded with a list of keywords that are often used to describe especially critical emergencies. As such, when the transcript analyzer 116 finds one of these keywords in a transcript associated with an emergency call, the PSAP Management System 106 can assign or update the emergency call's priority level within the call queue 108 based on that keyword. In other examples the transcript analyzer 116 can trigger the display of an alert within the dashboard 114 when a keyword is found, and a user can then review the transcript and determine whether to change the emergency call's priority level in the call queue 108.

In some examples the PSAP Management System 106 can comprise a voice stress analyzer 118 that reviews recorded audio emergency messages to estimate callers' stress levels. The voice stress analyzer 118 can be part of the speech-to-text transcriber 112, or be a separate system. The voice stress analyzer 118 can review factors such as the caller's rate of speech or tone of voice, as indicated by pitch and intensity levels. In these examples, when the voice stress analyzer 118 detects that a caller's voice is stressed above a threshold level, the PSAP Management System 106 can assign or update the associated emergency call's priority level within the call queue 108, or display an alert in the dashboard 114 requesting that a user further review the priority level of the emergency call.

In some examples, when an operator 104 becomes available to answer a call, the PSAP Management System 106 can be configured to route the emergency call in the call queue 108 that has the highest priority level to that operator 104. In examples in which the same priority level can be assigned to multiple emergency calls and more than one has been given the highest priority level, another attribute can be used to select the next call to be answered, such as the time a call was received or the time the calls have been hold.

In other examples, an available operator 104 can review the dashboard 108 and select the next emergency call in the call queue 108 that they want to answer based on the priority levels and transcripts.

In other examples, emergency calls that have had their priority levels increased from a default level based on their associated transcripts can be moved to a dedicated critical call queue 108 displayed separately in the dashboard 114. In these examples, if any emergency calls are present in the critical call queue 108, they can be answered before operators 104 answer any emergency calls in the regular call queue 108.

By prioritizing emergency calls in a call queue 108 based on automatically generated transcripts as described above, time-critical, life-threatening, or other particularly urgent emergency calls can be identified even when they are on hold. Such urgent emergency calls can accordingly be answered more quickly than if all emergency calls in the call queue 108 were answered in the order they were received.

Additionally, because operators 104 in some examples can have access to transcripts of emergency calls in the call queue 108 they have not yet answered, the operators 104 can review a transcript to understand an emergency even before they answer the emergency call. This knowledge can allow an operator 104 to more quickly dispatch emergency services and in some cases process emergency calls more quickly. Operators 104 can thus work more efficiently through a call queue 108, which can tend to decrease the number of emergency calls in the call queue 108 overall. This can lead to reduced memory usage for storing information associated with the call queue 108, as well as leading to new incoming emergency calls not waiting on hold as long.

Example Operations

Figure 4:
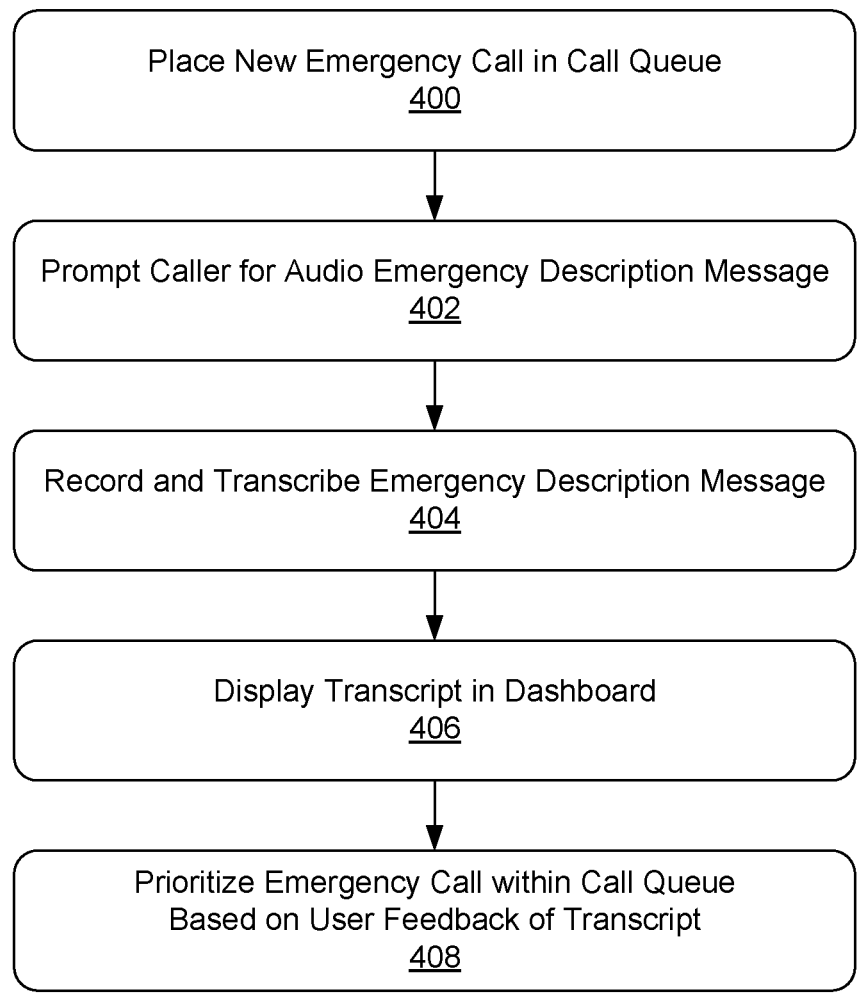
FIG. 4 depicts a flow chart of a first method for prioritizing emergency calls in a call queue with a PSAP Management System.

FIG. 4 depicts a flow chart of a first method for prioritizing emergency calls in a call queue 108 with a PSAP Management System 106.

At block 400, a new emergency call can be received at the PSAP 100. If no operators 104 are available to answer the call, a PSAP Management System 106 can place the emergency call on hold and add a representation of the emergency call to a call queue 108. The PSAP Management System 106 can assign a default priority level to the new emergency call.

At block 402, the PSAP Management System 106 can prompt the caller for an audio emergency description message, For example, the PSAP Management System 106 can play an audio message instructing the user to begin speaking to describe the emergency situation they are calling about.

At block 404, the PSAP Management System 106 can record the caller's audio emergency description message and generate a transcript from the audio emergency description message with the speech-to-text transcriber 112.

At block 406, the PSAP Management System 106 can display the transcript in association with the emergency call in a dashboard 114 visible to one or more users.

At block 408, the PSAP Management System 106 can receive instructions from a user, based on the user's review of the transcript, to adjust the emergency call's priority level within the call queue 108. For example, the instructions can be to move the emergency call higher in an ordered call queue, or to assign a particular value to a priority level attribute associated with the emergency call.

Emergency calls in the call queue 108 can be answered by operators 104 in an order at least partially determined by their priority levels. When an emergency call in the call queue 108 is answered, it can be removed from the call queue 108.

Blocks 404 and 406 can repeat and/or continue while an emergency call is on hold in the call queue 108, until the emergency call is answered by an operator 104. Accordingly, a caller can continue to leave an audio emergency description message while an emergency call is on hold, and the PSAP Management System 106 can continuously transcribe the audio emergency description message and update the transcript in the dashboard 114. As such, a user of the PSAP Management System 106 can update the emergency call's priority in the call queue 108 based on the transcript at block 408 at any point before the emergency call is answered.

Figure 5:
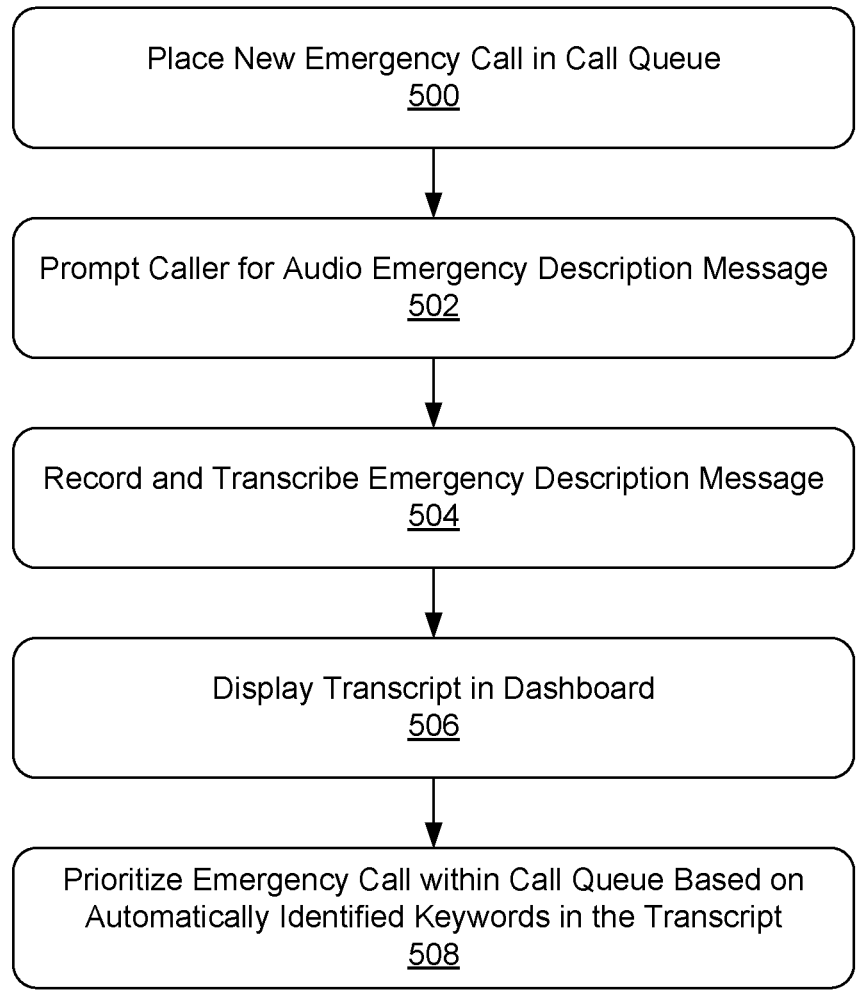
FIG. 5 depicts a flow chart of a second method for prioritizing emergency calls in a call queue with a PSAP Management System.

FIG. 5 depicts a flow chart of a second method for prioritizing emergency calls in a call queue 108 with a PSAP Management System 106.

At block 500, a new emergency call can be received at the PSAP 100. If no operators 104 are available to answer the call, a PSAP Management System 106 can place the emergency call on hold and add a representation of the emergency call to a call queue 108. The PSAP Management System 106 can assign a default priority level to the new emergency call.

At block 502, the PSAP Management System 106 can prompt the caller for an audio emergency description message. For example, the PSAP Management System 106 can play an audio message instructing the user to begin speaking to describe the emergency situation they are calling about.

At block 504, the PSAP Management System 106 can record the caller's audio emergency description message and generate a transcript from the audio emergency description message with the speech-to-text transcriber 112.

At block 506, the PSAP Management System 106 can display the transcript in association with the emergency call in a dashboard 114 visible to one or more users.

At block 508, the transcript analyzer 116 can search through the transcript for one or more predefined keywords. If a keyword is found, the PSAP Management System 106 can adjust the emergency call's priority level within the call queue 108 based on a priority level associated with the keyword, and/or display an alert in the dashboard 114 indicating that the emergency call should be further reviewed by a user.

Emergency calls in the call queue 108 can be answered by operators 104 in an order at least partially determined by their priority levels. When an emergency call in the call queue 108 is answered, it can be removed from the call queue 108.

Blocks 504, 506, and 508 can repeat and/or continue while an emergency call is on hold in the call queue 108, until the emergency call is answered by an operator 104. Accordingly, a caller can continue to leave an audio emergency description message while an emergency call is on hold, and the PSAP Management System 106 can continuously transcribe the audio emergency description message, update the transcript in the dashboard 114, review the transcript for keywords, and adjust the emergency call's priority in the call queue based on identified keywords. As such, the emergency call's priority in the call queue 108 can be automatically adjusted based on keywords identified in the transcript by the transcript analyzer 116 any point before the emergency call is answered.

Example Architecture

Figure 6:
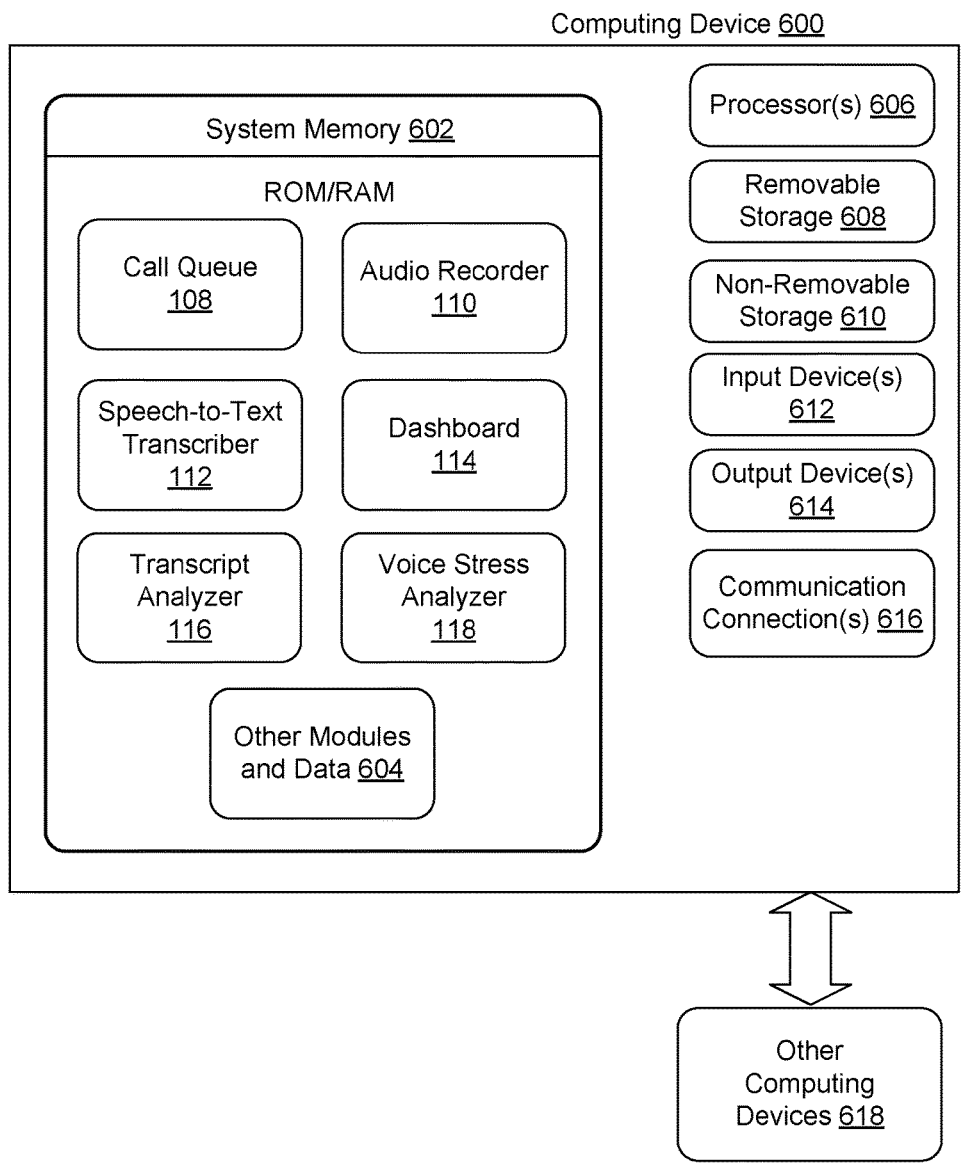
FIG. 6 illustrates an example computing device of the PSAP Management System.

FIG. 6 illustrates an example computing device 600 of the PSAP Management System 106, in accordance with various embodiments.

As illustrated, the computing device 600 comprises a system memory 602. The system memory 602 can store the data for the call queue 108, program modules and/or application data for the audio recorder 110, speech-to-text transcriber 112, dashboard 114, transcript analyzer 116, and/or voice stress analyzer 118, and other modules and data 604. The computing device 600 can also include processor(s) 606, removable storage 608 and/or non-removable storage 610, input device(s) 612, output device(s) 614, and communication connections 616 for communicating with other computing devices 618.

In various embodiments, system memory 602 is volatile (such as RAM), non-volatile (such as ROM, flash memory, etc.) or some combination of the two. Example system memory 602 may include one or more of RAM, ROM, EEPROM, a Flash Memory, a hard drive, a memory card, an optical storage, a magnetic cassette, a magnetic tape, a magnetic disk storage or another magnetic storage devices, or any other medium.

The call queue 108, audio recorder 110, speech-to-text transcriber 112, dashboard 114, transcript analyzer 116, and voice stress analyzer 118, shown as stored in memory 602, is described in greater detail above. While data for the call queue 108, audio recorder 110, speech-to-text transcriber 112, dashboard 114, transcript analyzer 116, and voice stress analyzer 118, is shown in FIG. 6 as being stored on a single computing device 600, such data can be stored across multiple computing devices 600 of the PSAP Management System 106, each computing device 600 implementing and/or storing one of the call queue 108, audio recorder 110, speech-to-text transcriber 112, dashboard 114, transcript analyzer 116, and voice stress analyzer 118, some of the call queue 108, audio recorder 110, speech-to-text transcriber 112, dashboard 114, transcript analyzer 116, and voice stress analyzer 118, or parts of one or more of the call queue 108, audio recorder 110, speech-to-text transcriber 112, dashboard 114, transcript analyzer 116, and voice stress analyzer 118.

The other modules and data 604 may be utilized by the computing device 600 to perform or enable performing any action taken by the PSAP Management System 106, The other modules and data 604 may include a platform and applications, and data utilized by the platform and applications.

In some embodiments, the processor(s) 606 is a central processing unit (CPU), a graphics processing unit (GPU), or both CPU and GPU, or other processing unit or component known in the art.

Computing device 600 can also include additional data storage devices (removable and/or non-removable) such as, for example, magnetic disks, optical disks, or tape. Such additional storage is illustrated in FIG. 6 by removable storage 608 and non-removable storage 610. Computer storage media may include volatile and nonvolatile, removable and non-removable media implemented in any method or technology for storage of information, such as computer readable instructions, data structures, program modules, or other data. System memory 602, removable storage 608 and non-removable storage 610 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer-readable storage media can be part of computing device 600.

In various examples, any or all of system memory 602, removable storage 608, and non-removable storage 610, store programming instructions which, when executed, implement some or all of the above-described operations of the PSAP Management System 106.

Computing device 600 can also have input device(s) 612, such as a keyboard, a mouse, a touch-sensitive display, voice input device, etc., and output device(s) 614 such as a display, speakers, a printer, etc. These devices are well known in the art and need not be discussed at length here.

Computing device 600 can also contain communication connections 616 that allow the computing device 600 to communicate with other computing devices 618, and/or answer and interact with emergency calls received at the PSAP 100. By way of a non-limiting example, communication connections 616 can allow operators or other users to access the dashboard 114 from their own computing devices 618. By way of another non-limiting example, communication connections 616 can allow the computing device 600 to place an incoming emergency call on hold, play audio messages for the caller while the emergency call is on hold, record the caller's emergency description message, and route the emergency call to an operator 104 when the emergency call is answered.

Conclusion

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method of prioritizing emergency calls, comprising:
    receiving an emergency call from a caller at a public safety answering point (PSAP) management system;
    placing the emergency call on hold and adding the emergency call to a call queue at the PSAP management system;
    recording an audio emergency description message from the caller at the PSAP management system while the emergency call is on hold;
    generating a transcript of the audio emergency description message at the PSAP management system using automatic speech recognition;
    displaying the transcript in a dashboard visible to users of the PSAP management system while the emergency call is on hold; and
    assigning a priority level to the emergency call in the call queue at the PSAP management system based on the transcript,
    wherein the recording the audio emergency description message is performed continuously while the emergency call is on hold and generating the transcript comprises generating at least one updated transcript and displaying the transcript comprises displaying the updated transcript.

2. The method of claim 1, wherein the call queue comprises a plurality of emergency calls that are on hold, the plurality of emergency calls being ordered within the call queue by the priority level assigned to the plurality of emergency calls.

3. The method of claim 1, wherein the call queue stores a priority attribute associated with each of a plurality of emergency calls, values of the priority attributes indicating priority levels assigned to the associated emergency calls.

4. The method of claim 1, wherein assigning the priority level to the emergency call in the call queue comprises receiving user instructions to change the priority level based on the user's review of the transcript.

5. The method of claim 1, further comprising searching the transcript for predefined keywords with a transcript analyzer at the PSAP management system.

6. The method of claim 5, wherein assigning the priority level to the emergency call in the call queue comprises assigning a priority level associated with a keyword found in the transcript.

7. The method of claim 5, further comprising displaying an alert in the dashboard when the transcript analyzer finds a keyword in the transcript.

8. The method of claim 1, further comprising taking the emergency call off hold, removing the emergency call from the call queue, and routing the emergency call to be answered when the emergency call has the highest priority level in the call queue and an operator becomes available to answer a call in the call queue.

9. A system for prioritizing emergency calls, comprising:
    a call queue that stores data associated with received emergency calls that have not yet been answered, each emergency call being associated with a priority level in the call queue;
    an audio recorder that records audio emergency description messages in association with the received emergency calls;
    a speech-to-text transcriber that uses automatic speech recognition to generate transcripts from the audio emergency description messages; and
    a dashboard that displays the emergency calls in the call queue in a user interface along with their associated transcripts and associated priority levels,
    wherein the priority level of each emergency call in the call queue is adjustable based on their associated transcripts, and
    wherein the audio recorder continuously records the audio emergency description message while the emergency call is on hold, the speech-to-text transcriber uses automatic speech recognition to generate updated transcripts, and the dashboard displays the updated transcripts.

10. The system of claim 9, wherein the dashboard displays the emergency calls in the call queue in order of their priority levels.

11. The system of claim 9, wherein the priority level of each emergency call in the call queue is adjustable based on receipt of user instructions.

12. The system of claim 9, further comprising a transcript analyzer that searches the transcripts for predefined keywords.

13. The system of claim 9, wherein the transcript analyzer adjusts the priority level of an emergency call within the call queue upon finding one or more of the predefined keywords within the transcript associated with the emergency call.

14. The system of claim 9, wherein the dashboard displays an alert when the transcript analyzer finds one or more of the predefined keywords within a transcript associated with an emergency call.

15. One or more non-transitory computer-readable media storing computer-executable instructions that, when executed by one or more computing devices, cause the one or more computing devices to perform operations comprising:
    receiving an emergency call from a caller at a public safety answering point (PSAP) management system;
    placing the emergency call on hold and adding the emergency call to a call queue;
    recording an audio emergency description message from the caller while the emergency call is on hold;
    generating a transcript of the audio emergency description message using automatic speech recognition;

displaying the transcript in a dashboard visible to users while the emergency call is on hold; and assigning a priority level to the emergency call in the call queue based on the transcript, wherein the recording the audio emergency description message is performed continuously while the emergency call is on hold and generating the transcript comprises generating at least one updated transcript and displaying the transcript comprises displaying the updated transcript.

16. The one or more non-transitory computer-readable media of claim 15, wherein the operations further comprise assigning a default priority level to the emergency call in the call queue when the emergency call is placed on hold, wherein assigning the priority level based on the transcript comprises changing the default priority level.

17. The one or more non-transitory computer-readable media of claim 15, wherein assigning the priority level to the emergency call in the call queue comprises receiving user instructions to change the priority level based on the user's review of the transcript.

18. The one or more non-transitory computer-readable media of claim 15, wherein the operations further comprise searching the transcript for predefined keywords.

19. The one or more non-transitory computer-readable media of claim 18, wherein assigning the priority level to the emergency call in the call queue comprises assigning a priority level associated with a keyword found in the transcript.

20. The one or more non-transitory computer-readable media of claim 18, wherein the operations further comprise displaying an alert in the dashboard when a keyword is found in the transcript.

* * * * *